(12) United States Patent
Niedermeier

(10) Patent No.: US 8,150,759 B2
(45) Date of Patent: Apr. 3, 2012

(54) AUCTION SYSTEM

(76) Inventor: Astrid Niedermeier, Regenstauf (DE)

( * ) Notice: Subject to any disclaimer, the term of this patent is extended or adjusted under 35 U.S.C. 154(b) by 933 days.

(21) Appl. No.: 11/296,283

(22) Filed: Dec. 8, 2005

(65) Prior Publication Data

US 2007/0136176 A1   Jun. 14, 2007

(51) Int. Cl.
*G06Q 40/00* (2012.01)
(52) U.S. Cl. .......................... 705/37; 705/26.1
(58) Field of Classification Search .............. 705/37, 705/26.1
See application file for complete search history.

(56) References Cited

U.S. PATENT DOCUMENTS

| | | | |
|---|---|---|---|
| 6,243,691 B1 * | 6/2001 | Fisher et al. | 705/37 |
| 6,665,649 B1 * | 12/2003 | Megiddo | 705/37 |
| 6,847,939 B1 * | 1/2005 | Shemesh | 705/26 |
| 7,058,602 B1 * | 6/2006 | La Mura et al. | 705/37 |
| 7,085,740 B1 * | 8/2006 | Meyers | 705/37 |
| 7,599,878 B2 * | 10/2009 | Atkinson et al. | 705/37 |
| 7,627,500 B2 * | 12/2009 | Zhang et al. | 705/26.3 |
| 7,792,713 B1 * | 9/2010 | Kinney et al. | 705/35 |
| 2002/0007338 A1 * | 1/2002 | Do | 705/37 |
| 2004/0039680 A1 * | 2/2004 | Horch et al. | 705/37 |
| 2005/0165650 A1 * | 7/2005 | Kothapalli et al. | 705/26 |

OTHER PUBLICATIONS

Marta Eso, Soumyadip Ghosh, Jayant Kalagnanam, & Laszlo Ladanyi. (2005). Bid Evaluation in Procurement Auctions with Piecewise Linear Supply Curves. Journal of Heuristics, 11(2), 147-173.*

Lawrence M. Ausubel, & Peter Cramton. (2004). Vickrey auctions with reserve pricing. Economic Theory, 23(3), 493.*

Lawrence M Ausubel. (2004). An Efficient Ascending-Bid Auction for Multiple Objects. The American Economic Review, 94(5), 1452-1475.*

* cited by examiner

*Primary Examiner* — Hani M Kazimi
(74) *Attorney, Agent, or Firm* — Welsh Flaxman & Gitler LLC

(57) ABSTRACT

The invention pertains to a system, and method, for auctioning articles, or products of various types, via a public data transmission network, such as the Internet. The bidders participate by submitting a bid via their bidder terminal, to the auction platform, which is integrated into the data transmission system, and permits bi-directional transmission between the terminals and the auction platform. The system functions as a virtual auction house.

7 Claims, 4 Drawing Sheets

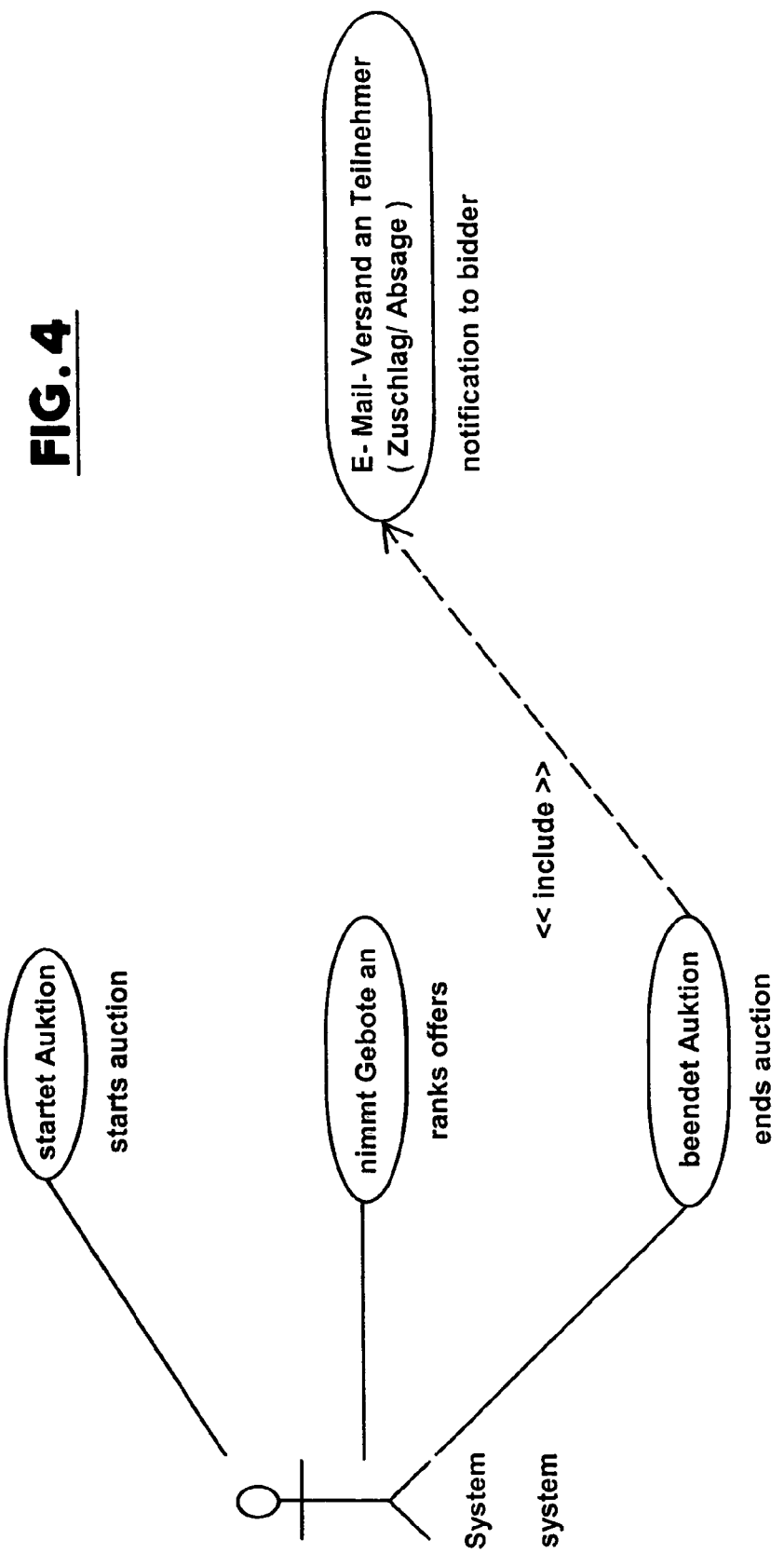

AUCTION SYSTEM

The invention relates to an auction system, i.e. to a system and a method for auctioning articles or products via a data transmission network.

The system according to the invention is used for the simultaneous auctioning of a plurality of identical articles or products of varying types in a common auction and in particular for the sale of new products, such as street vehicles, electronics products, household articles, etc.

The object of the invention is to promote the sale of identical products existing in large quantities. This object is achieved by a system according to claim 1 and a method according to claim 6.

Further embodiments of the invention are the subject matter of the dependent claims. The invention is described in more detail below based on a sample embodiment with reference to the drawings, wherein:

FIG. 4 shows a chart from the system's perspective.

Figure 1:
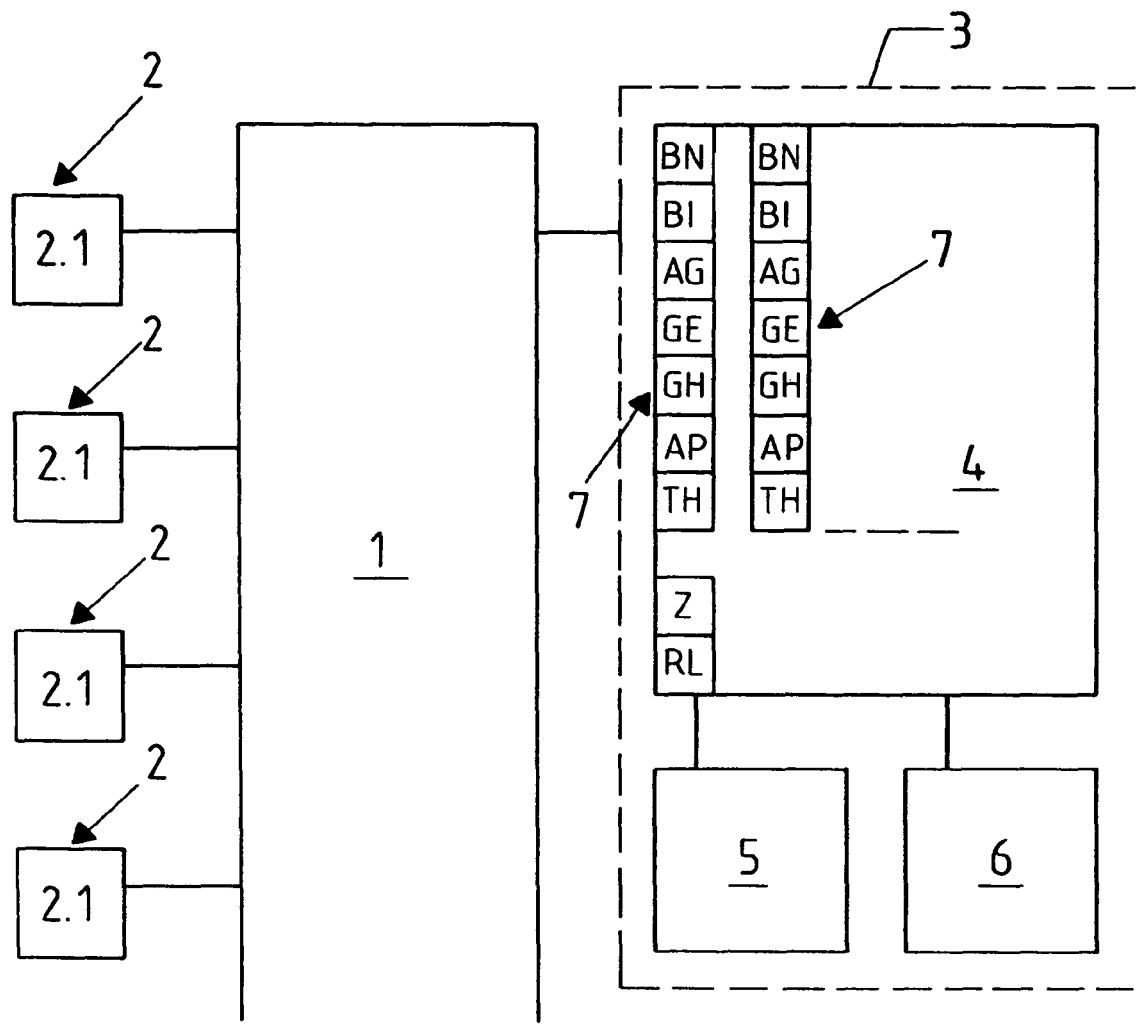
FIG. 1 shows, in a very simplified schematic representation, a system for auctioning articles via a public network, for example via the Internet.

In FIG. 1, a public data transmission network, for example the Internet, with the capability of bi-directional data transmission is generally designated 1. Various users or bidders are designated 2, and 2.1 designates the user terminals (e.g. personal computers) allocated to the users or bidders for establishing contact via the data transmission network 1 with servers or computers, etc. assigned to said network for the purpose of data transmission, which is for example bi-directional.

In FIG. 1, 3 designates such a server or computer, on which a special auction platform, explained in more detail below, is installed with corresponding auction software and which therefore is designed as a virtual auction house for auctioning products or articles of various types.

The computer 3 comprises, in addition to a central computer unit 4, which is used for example to control and execute the program, an input unit 5 (e.g. keyboard and/or interface) with a monitor 6 for entering data, programs, etc., a plurality of memory areas 7 in particular for entering parameters in connection with the respective auction and each of which is allocated to one user 2 or user terminal 2.1, insofar as the user 2, after accessing the computer 3 and after selection of an auction offer, has registered as a bidder 2 for participation in a particular auction or for auctioning a particular product. The registration takes place for example by entering a unique bidder identification BI identifying the respective user 2 and received by the user 2 from the computer 3 for example on request via the system, for example upon the initial access to said computer 3 or to the virtual auction house stored on this computer.

The respective auction is selected for example from a menu, in which the pending or active auctions are displayed, and in which the articles to be auctioned are described and also pictured. It is assumed that a plurality of bidders 2 will take part in each auction.

The memory area 7 provided for the respective user or bidder 2 for the auction currently selected by the bidder is used for storage or temporary storage of a plurality of data required for executing the auction, including the bidder identification BI, the bidder number BN, the identification of the article AG upon which the selected auction is based, for example in the form of a multi-digit call number and description, the calling price AP, the bidder's own last bid GE, the highest bid GH made by one of the bidders during the current auction and the time TH of the auction, e.g. the beginning and end or the remaining time of the current auction.

In a memory area 8 not accessible to the user or bidder 2, additional data and parameters required for conducting the auction are stored, for example the number Z of articles (lot size) lined up for auctioning in the current auction and the last bids of all bidders 2 participating in the auction, listed in order of their amount, or a derived ranking list RL in which the bidders are listed in order of the amount of their last bid.

Figure 2:
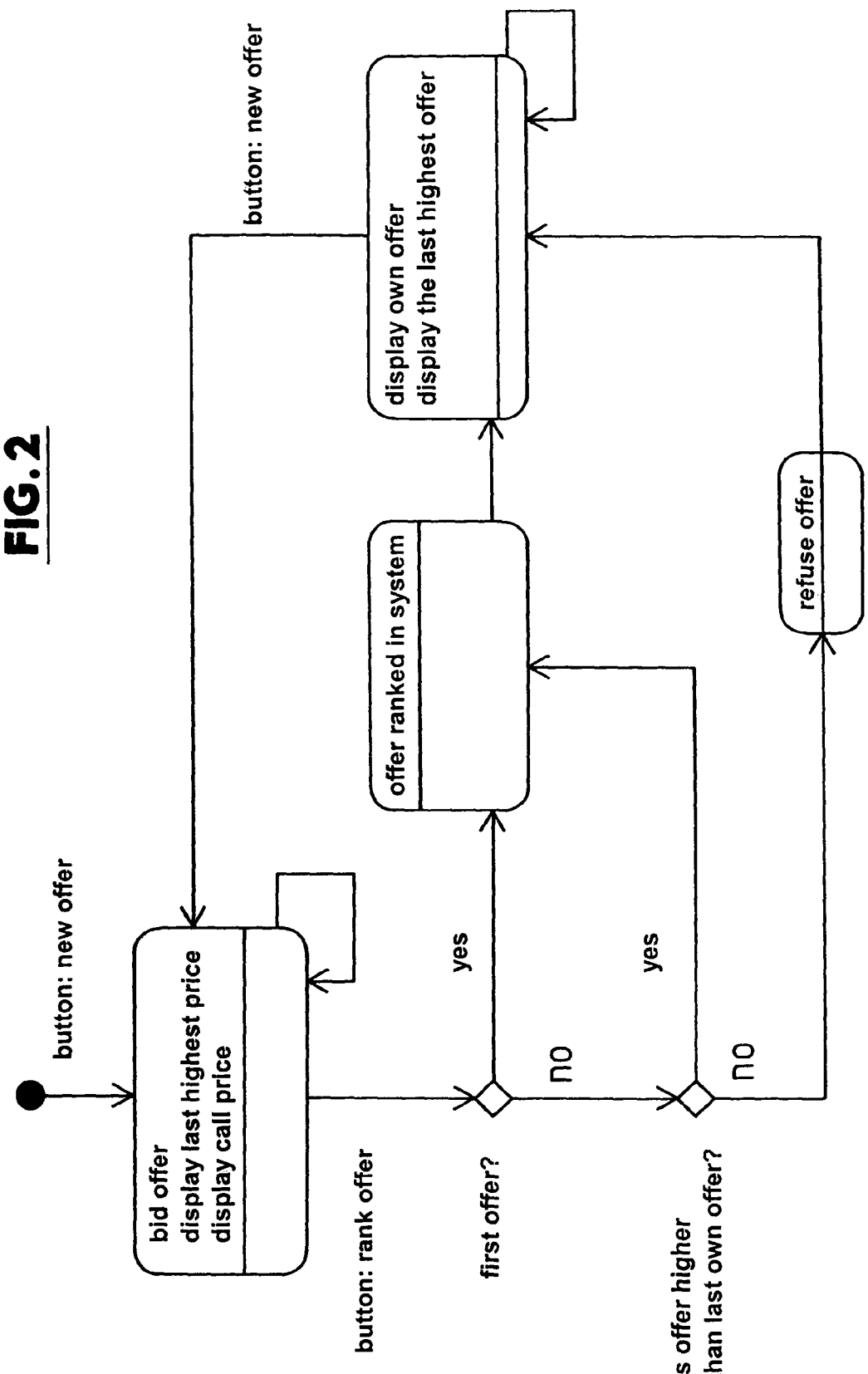
FIGS. 2 and 3 show flowcharts to explain the system according to the invention.

FIG. 2 shows, in a flow chart, the procedure for the auction with respect to the communication between a bidder 2 and the computer 3. At the start of participation in the auction, the calling price AP and the last highest bid GH are displayed on the monitor for each bidder 2, in addition to information on the auction article AG. Each bidder 2 is requested to enter his bid GE, which is higher than the calling price AP. It is not necessary, however, that the bidder's own bid GE be higher than the last highest bid GH.

After the first bid has been entered by the respective bidder 2, the computer 3 determines whether the bid is actually the first bid of that bidder 2. If this is the case, this bid is stored in the ranking list RL, and at the same time in the memory area 7 allocated to this bidder 2 as his own bid GE, so that this own bid GE is displayed on the monitor of the bidder 2 together with the calling price AP and the last highest bid GH. Each further bid GE of each bidder 2 is evaluated in the computer 3 to determine whether it is higher than the previous bid GE of the same bidder 2. If this is not the case, then the further bid GE is rejected, which is displayed on the monitor of the respective bidder 2. The previous bid is retained as a valid bid in the ranking list RL and in the memory area 7 allocated to the respective bidder 2.

If the further bid GE is higher than the previous bid GE, then the further bid is stored as the current bid in the ranking list and memory area 7 of the respective bidder 2 and is displayed on his monitor.

Figure 3:
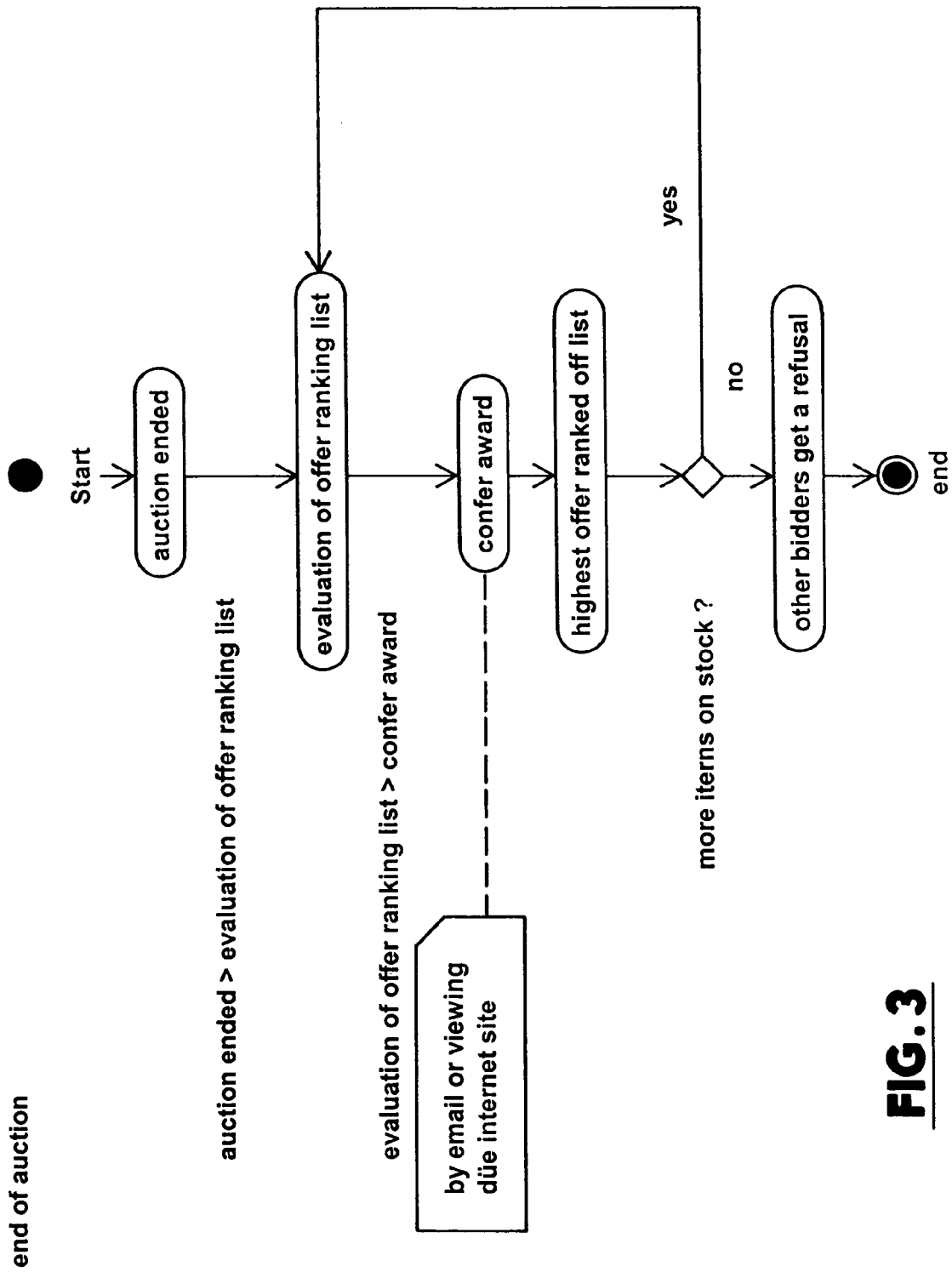

FIG. 3 shows a flow chart relevant to the allocation of the auctioned articles (acceptance of the bid) by the computer 3 after evaluating the data of the ranking system or of the ranking list RL. In this evaluation, which is conducted after completion of each auction, the individual bidders 2 receive their lot in the order of their last bids or in the order of their position in the ranking list RL, each bidder 2 at the price corresponding to his last bid GE accepted by the system.

Therefore, from the existing number of articles or from the existing lot size Z, the bidder 2 with the highest bid is served first, followed by the remaining bidders 2, in the order of their position in the ranking list RL. If the lot size Z is equal to or greater than the number of bidders 2, then each bidder 2 receives the auctioned article at his last bid GE. If the number of bidders 2 is greater than the lot size Z, then the auctioned article is given only to some of the bidders 2, corresponding to their order in the ranking list RL until the lot size Z has been allotted, here again to each bidder at his last bid GE.

The acceptance of the bid is displayed on the monitor to each bidder 2 or the bidders are notified otherwise, e.g. via e-mail. Each auction is limited in duration. The start and end or the remaining time are displayed to the bidders 2 participating in the auction with the time notice TH. After the auction time has elapsed, no further bids GE are possible.

It is fundamentally possible, however, to conduct the auction so that the start of the auction is specified, but the auction ends after a time period within a remaining time generated by a random generator.

The invention was described above based on an exemplary embodiment. It goes without saying that numerous variations are possible. For example, it is possible to provide several interconnected computers in lieu of the computer 3, in which case the auction platform with the auction program is installed on at least one of these computers. Furthermore, it is possible to combine some of the separate functions described above, for example, to store the respective valid bid GE of each bidder 2 only once, e.g. in the ranking system or in the ranking list RL and not additionally in the memory area 7. The same applies to the last or current highest bid GH.

The system according to the invention also makes it possible to conduct several auctions simultaneously or temporally overlapping.

The invention claimed is:

1. A method for auctioning a plurality of identical products via a data transmission network comprising an auction platform formed by at least one computer, including a central computer unit for controlling and executing the method, an input unit for entering data and programs, a plurality of memory areas, and a plurality of bidder or user terminals connected to the computer, each terminal allocated to at least one bidder, the method comprising the steps of:
    a) transmitting a request to make a bid and information containing at least one calling price via the data transmission network to the bidder terminal connected to the auction platform to initiate the auction;
    b) transmitting a current highest bid via the data transmission network to the bidder terminal connected with the auction platform during the auction;
    c) evaluating each bid of a bidder, via the auction platform, and
    d) rejecting such bid if it is not equal to, or greater than, the calling price and is not greater than a previous bid of that bidder, or
    e) accepting such bid if it is equal to, or greater than, the calling price and is greater than a previous bid of that bidder,
    f) storing a last accepted bid of each bidder and a lot size of the plurality of identical products in the memory of the auction platform, in a ranking list, wherein the last accepted bid of each of the plurality of bidders are listed in the ranking list in order of a value corresponding to an amount of the last accepted bid of each of the plurality of bidders;
    g) maintaining the ranking list, in the current auction, in secrecy, so that the amount of the last accepted bid of each of the plurality of bidders, the number of bidders and the lot size of the plurality of identical products awaiting consideration in the current auction, are hidden from the bidders;
    h) closing the auction; and
    i) allocating the plurality of identical articles among the bidders in order of their position on the ranking list based upon the value of the last accepted bid of each of the plurality of bidders until the lot size has been fully allotted and notifying, via the auction platform, the bidders whether they have won at least one of the plurality of identical products.

2. The method according to claim 1, wherein the ranking list is utilized to auction off several of the products, at successively lower prices.

3. The method of claim 1, wherein each bidder must be registered in order to participate in an auction.

4. The method of claim 1, wherein a monitor is provided to each bidder, and at the start of the auction, the monitor displays the calling price and the last highest bid for each bidder, in addition to information about the auction article.

5. The method of claim 1, wherein the auction platform includes a timer; and said method includes the steps of:
    j) turning on the timer at the beginning of the auction and allowing the timer to run for a pre-set interval, and
    k) blocking further bids from reaching platform when the timer reaches the end of the pre-set interval.

6. The method of claim 5, including the step of:
    l) transmitting the amount of time remaining in the auction to the monitor associated with each bidder.

7. The method of claim 5, wherein the timer includes a random number generator for ending the auction after a period of time specified by the timer.

* * * * *